(12) United States Patent
Harmer et al.

(10) Patent No.: US 12,067,556 B2
(45) Date of Patent: Aug. 20, 2024

(54) GENERATING VIRTUAL CREDIT CARDS WHEN PURCHASING PRODUCTS FROM A MERCHANT SYSTEM

(71) Applicant: PayCertify, Inc., Los Gatos, CA (US)

(72) Inventors: Robert Chase Harmer, Los Gatos, CA (US); Gregory Prokter, Saratoga, CA (US)

(73) Assignee: PayCertify, Inc., Reno, NV (US)

( * ) Notice: Subject to any disclaimer, the term of this patent is extended or adjusted under 35 U.S.C. 154(b) by 0 days.

(21) Appl. No.: 16/818,693

(22) Filed: Mar. 13, 2020

(65) Prior Publication Data

US 2021/0103918 A1  Apr. 8, 2021

Related U.S. Application Data

(60) Provisional application No. 62/910,945, filed on Oct. 4, 2019.

(51) Int. Cl.
*G06Q 20/34* (2012.01)
*G06N 20/00* (2019.01)

(52) U.S. Cl.
CPC ........... *G06Q 20/351* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,706,453 B1 * | 7/2020 | Morin | ..................... | G06N 20/20 |
| 2001/0014868 A1 * | 8/2001 | Herz | ...................... | G06Q 30/02 |
| | | | | 705/26.1 |
| 2004/0083183 A1 * | 4/2004 | Hardesty | ................ | G06Q 20/04 |
| | | | | 705/65 |
| 2005/0144084 A1 * | 6/2005 | Gold | .................. | G06Q 30/0631 |
| | | | | 705/26.7 |
| 2012/0011025 A1 | 1/2012 | Hunt | | |
| 2012/0323682 A1 * | 12/2012 | Shanbhag | .......... | G06Q 30/0641 |
| | | | | 705/14.66 |

(Continued)

OTHER PUBLICATIONS

International Search Report and Written Opinion, Patent Cooperation Treaty Application No. PCT/US2020/053961, Jan. 6, 2021, eleven pages.

*Primary Examiner* — Joseph W. King
*Assistant Examiner* — Carol A See
(74) *Attorney, Agent, or Firm* — FENWICK & WEST LLP

(57) ABSTRACT

A merchant system offers various products for sale to users. The merchant system receives a set of application programming interface (API) calls from an online system allowing the merchant system to provide a user with a virtual credit card when the user is purchasing products via the merchant system. The merchant system provides one or more conditions to the online system and provides information describing an order by a user via the merchant system. By applying a machine learned model to characteristics of the users and characteristics of one or more orders by the merchant system, the online system determines an amount for the virtual credit card. When the user's order satisfies the conditions, the online system issues the virtual credit card and transmits information describing the virtual credit card to the merchant system, which the virtual credit card information to the user while the user completes the order.

20 Claims, 2 Drawing Sheets

(56) References Cited

U.S. PATENT DOCUMENTS

| | | | |
|---|---|---|---|
| 2013/0268356 A1* | 10/2013 | Quatse | G06Q 30/0254 |
| | | | 705/14.52 |
| 2014/0019352 A1 | 1/2014 | Shrivastava | |
| 2015/0227919 A1 | 8/2015 | Milner et al. | |
| 2016/0086222 A1* | 3/2016 | Kurapati | G06Q 40/08 |
| | | | 705/14.53 |
| 2017/0076277 A1 | 3/2017 | Zhou et al. | |
| 2018/0114245 A1* | 4/2018 | Lurie | G06Q 30/0239 |
| 2019/0108509 A1 | 4/2019 | Hammad | |
| 2020/0160368 A1* | 5/2020 | Miller | G06Q 20/351 |
| 2020/0334719 A1* | 10/2020 | Borchers | G06N 7/005 |

* cited by examiner

GENERATING VIRTUAL CREDIT CARDS WHEN PURCHASING PRODUCTS FROM A MERCHANT SYSTEM

CROSS-REFERENCE TO RELATED APPLICATIONS

This application claims the benefit of U.S. Provisional Application No. 62/910,945, filed Oct. 4, 2019, which is incorporated by reference in its entirety.

BACKGROUND

A merchant system offers various products for sale to users. For example, the merchant system presents information describing different goods or services to users, and receives selections of goods or services from users. The merchant system receives payment from a user for products, such as goods or services, selected by the user and provides the products to the user after receiving payment.

However, many users may refrain from purchasing products from a merchant system despite frequently accessing or visiting the merchant system. While a merchant system may seek to entice users to purchase products through promotional offers, such as discounts on products, such promotions may discourage users from purchasing products from the merchant system unless the merchant system is offering a promotional offer. However, offering a promotional offer, such as a discount, lowers the effective price of the products subject to the promotional offer, which may reduce a perception of the products, or of a brand supplying the products, to users.

SUMMARY

A merchant system offers various products for sale to users. For example, the merchant system presents information describing different goods or services to users, and receives selections of goods or services from users. Subsequently, the merchant system receives payment information from a user for products selected by the users, allowing the user to purchase the selected products.

The merchant system receives a set of application programming interface (API) calls from an online system allowing the merchant system to provide a user with a virtual credit card when the user is purchasing products via the merchant system by exchanging information with the online system via the received API calls to receive the virtual credit card issued to the user by the online system. Alternatively, the merchant system accesses a website provided by the online system to provide the user with the virtual credit card. The merchant system provides one or more criteria to the online system and provides information describing a purchase by a user via the merchant system. Example criteria include a minimum total purchase amount, purchase of a specific product, or purchasing products within a specified time interval, a user leaving the merchant system with one or more products included in an online shopping cart, a user accessing a specific product via the merchant system at least a threshold number of times, and the user adding and removing one or more products from an online shopping cart via the merchant system. When the user's purchase user satisfies one or more of the criteria, the online system issues a virtual credit card to the user and transmits information describing the virtual credit card to the merchant system. For example, if the user's total purchase amount is greater than $150, the online system issues a virtual credit card to the user and transmits information identifying the virtual credit card to the merchant system.

After the merchant system transmits funds to the online system, the online system credits an account for the merchant (a "merchant account") by the amount of the funds and receives the conditions for issuing virtual credit cards to the online system, a user accesses the merchant system. When the user accesses the merchant system, the merchant system transmits information describing the user to the online system. For example, when the user logs in to the merchant system to access a user account maintained by the merchant system, the merchant system transmits information describing the user to the online system along with information identifying the user. As another example, the merchant system receives an identifier of a client device or a browser used by the user to access the merchant system along with information previously received by the merchant system from the identifier of the client device or the browser. The information describing the user includes characteristics of the user and characteristics of one or more orders the merchant system previously received from the user The online system maintains an artificial intelligence machine learned model for issuing a virtual credit card by the merchant system to a user to the online system. In some embodiments, the online system maintains different machine learned models for different merchant systems and stores each model in association with an identifier of the merchant system. The online system model trains the model to determine a probability of a user completing a purchase from the merchant system when offered different amounts via a virtual credit card from the merchant system. The machine learned model receives as input different characteristics of a user and prior purchases of the user from the merchant system and generates a probability of the user completing a purchase via the merchant system for different amounts of a virtual credit card offered by the merchant system to the user. Example characteristics of a user received as input by the model include: an amount of revenue the merchant system received form the user during a specific time interval (e.g., a month), a frequency with which the user visits the merchant system, products offered by the merchant system that the user has previously purchased, amounts of various orders that the user has previously purchased from the merchant system, amounts of orders that the user has previously specified by not purchased from the merchant system, or any other suitable information.

Additionally, the machine learned model accounts for characteristics of products the user has currently selected for purchase from the merchant system. Example characteristics of products currently selected for purchase from the merchant system include: a number of times the user has accessed information about a product via the merchant system (e.g., a number of times the user views a page describing the product), a number of times the user has previously purchased the product, a number of times the user has previously selected the product for purchase but not purchased the product, or any other suitable information. However, in other embodiments, the trained machine-learning model may use any suitable characteristics or combination of characteristics of a user from the merchant system and characteristics of orders by the user from the merchant system as inputs. From the characteristics of one or more orders via the merchant system, characteristics of the user received from the merchant system, and one or more amounts for a virtual credit card issued by the merchant system, the trained machine-learning model outputs a probability of the user completing an order from the merchant system when issued a virtual credit card for different amounts.

In various embodiments, the online system trains the trained machine-learning model based on information describing prior completion of orders by different users from the merchant system when users receive virtual credit cards having different amounts from the merchant system. For example, the online system applies a label indicating whether a user completed a purchase via the merchant system when offered a virtual credit card for a specific amount from the merchant system to characteristics of the order and characteristics of the user who placed the order. From the labeled characteristics of the orders and corresponding characteristics of the users, the online system trains the trained artificial intelligence machine learning model using any suitable training method or combination of training methods.

After training, the online system applies the trained machine-learned model to characteristics of an order received from the merchant system and to characteristics of the user received form the merchant system, and different amounts of a virtual credit card issued by the merchant system, and the trained machine-learned model output probabilities of the user completing the order when offered a virtual credit card having different amounts. Hence, application of the trained machine learned model determines probabilities of the user completing a purchase when offered different amounts of a virtual credit card by the merchant system.

The online system applies the model to the characteristics of the user and characteristics of orders the merchant system previously received from the user. When the user initiates an order from the merchant system via a client device, the merchant system transmits information identifying the order to the online system. For example, the user accesses a website or an application associated with the merchant system via the client device, selects one or more products from the merchant system via the client device, and transmits a request to purchase the selected one or more products including identifiers of the one or more products to the merchant system to initiate an order. The online system includes the information identifying the order in the characteristics of orders and characteristics of the user to which the online system applies the trained machine learned model. This allows the online system to determine likelihoods of the user completing the initiated order if the merchant system issues virtual credit cards in different amounts to the user, allowing the online system to select an amount for a virtual credit card to offer the user that maximizes a likelihood of the user completing the initiated order.

In some embodiments, the online system transmits a message to the merchant system for display to the user that identifies the amount of the virtual credit card selected by the online system. The merchant system transmits the message to the client device along with content describing one or more products. In some embodiments, the message identifies one or more criteria for the user's order to satisfy, in order for the merchant system to issue a virtual credit card for the selected amount to the user. For example, the message identifies an amount for the order to reach for the merchant system to issue a virtual credit card for the selected amount to the user. In some embodiments, the message includes one or more instructions specifying when the message is displayed. For example, one or more instructions included in the message cause the message to be displayed when the merchant system adds an additional product to a current order or when the merchant system displays an online shopping basket or other information describing a current order.

In various embodiments, the merchant system receives the virtual credit card information from the online system before the user completes a purchase via the merchant system. Virtual credit card information received from the online system includes the selected amount of the virtual credit card, a number of times the virtual credit card may be used, an activation date of the virtual credit card, a termination date after which the virtual credit card may not be used, as well one or more codes identifying the virtual credit card. For example, after receiving payment information from a specific user, the online system displays information identifying the virtual credit card to the user via an order confirmation web page. This allows the specific user to use the virtual credit card to pay for a portion of the specific user's purchase, enabling the specific user to reduce the amount the user pays for the purchase if the user uses the virtual credit cart. Hence, the virtual credit card allows the merchant to discount the specific user's purchase price without offering a discount to all users, which may reduce the specific user's perception of the merchant system. Additionally, providing a user with information about the virtual credit card while the user is purchasing products from the merchant system may entice the user to purchase additional products from the merchant system or to more frequently purchase products from the merchant system. In various embodiments, the merchant system specifies an activation date and a termination date for the virtual credit card that are both later than a date of the purchase, allowing the user to use the virtual credit card for one or more subsequent purchases from the merchant system made after the purchase and before the termination date of the virtual credit card; this may entice the user to make additional purchases via the merchant system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
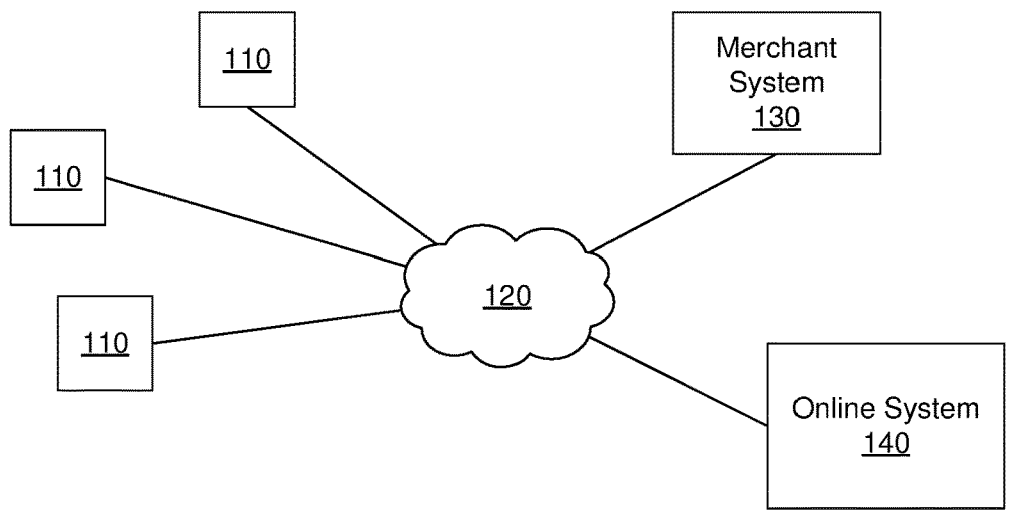
FIG. 1 is a block diagram of a system environment in which a pricing server operates, in accordance with an embodiment.

FIG. 1 is a block diagram of a system environment 100 for an online system 140. The system environment 100 shown by FIG. 1 comprises one or more client devices 110, a network 120, a merchant system 130, and the online system 140. In alternative configurations, different or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the merchant system 130, or other third party systems. For example, a client device 110 executes a browser application to enable interaction between the client device 110 and the merchant system 130 via the network 120. In another embodiment, a client device 110 interacts with the merchant system 130 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more merchant systems 130 may be coupled to the network 120 for communicating with the online system 140, which is further described below in conjunction with FIG. 2, and with a client device 110. While FIG. 1 shows a single merchant system 130 for purposes of illustration, in other embodiments, any number of merchant systems 130 may be coupled to the network 120. A merchant system 130 maintains information describing one or more products (e.g., goods or services) offered for purchase via the merchant system 130. In various embodiments, client devices 110 obtain the descriptions of one or more products from the merchant system 130 and present the obtained descriptions to users. Additionally, the merchant system 130 associates prices with different products. For example, the merchant system 130 associates a monetary amount with a product that is presented to a user in conjunction with a description of the product. Via a client device 110, a user selects one or more products offered by the merchant system 130 from descriptions of one or more products the client device 110 obtains from the merchant system 130 and provides the merchant system 130 with payment information for the merchant system 130 to obtain payment for the selected one or more products. In response to receiving the amount of compensation, the merchant system 130 provides the selected one or more products to the user.

In various embodiments, the merchant system 130 transmits various pages to the client device 110 for a user of the client device 110 to purchase products. For example, the merchant system 130 transmits a checkout page to a client device 110 that identifies products selected by a user of the client device 110 and includes one or more fields for the user to provide payment information for the identified products. Additionally, the merchant system 130 may transmit an order confirmation page to the client device 110 that is presented after the user identifies selected products to the merchant system 130 and provides payment information to the merchant system 130. By interacting with the order confirmation page, a user finalizes a purchase of products from the merchant system 130.

The online system 140 receives funds from the merchant system 130 and one or more conditions for establishing a virtual credit card for a user of the merchant system 130. A virtual credit card corresponds to an account maintained by the online system 140 from the funds received from the merchant system 130. The virtual credit card includes a unique code or other identifying information generated by the online system 140 that uniquely identifies the virtual credit card. The online system 140 receives information from the merchant system 130 or from a client device 110 identifying a purchase from a user via the merchant system 130 and compares the received information to the one or more conditions. In response to information identifying the purchase satisfying one of the received conditions, the online system 140 generates a virtual credit card for the user to use when purchasing products from the merchant system 130. As further described below in conjunction with FIG. 3, the online system 140 maintains a machine learned model that is associated with the merchant system 130. The machine learned model receives inputs as characteristics of a user from the merchant system 130, characteristics of one or more prior orders by the user via the merchant system 130, characteristics of a current order by the user via the merchant system 130, and an amount for a virtual credit card issued by the merchant system 130. The trained machine learned model is applied to different amounts for a virtual credit card issued by the merchant system 130 and outputs a probability of the user completing a purchase of an order via the merchant system 130 when the merchant system 130 issues a virtual credit card for different amounts. From application of the trained machine learned model, the online system 130 selects an amount for the virtual credit card having a maximum probability of the user completing a purchase of the order via the merchant system 130. The virtual credit card has a specified amount that is debited from the account the online system 140 maintains for the merchant system 130. In various embodiments, the online system 140 generates a virtual credit card for the selected amount in response to information identifying the purchase satisfying the condition.

The online system 140 stores an association between the account maintained by the online system 140 for the merchant system 130 (the "merchant account"), the selected amount, the merchant system 130, and the information identifying the virtual credit card. After generating the virtual credit card, the online system 140 transmits information identifying the virtual credit card, such as the unique code corresponding to the virtual credit card and the specified amount of the virtual credit card, to the merchant system 140, which transmits information describing the virtual credit card to the client device 110. In other embodiments, the online system 140 transmits the information describing the virtual credit card to the client device 110. This allows a user to use the specific amount corresponding to the virtual credit card to a purchase of products from the merchant system 130 by selecting or otherwise providing the information describing the virtual credit card to the client device 110. Generation of the virtual credit card by the online system 140 is further described below in conjunction with FIG. 3.

Additionally, the online system 140 provides an application programming interface (API) to the merchant system 130, allowing the merchant system to include one or more API calls in a checkout page transmitted to a client device 110 by the merchant system 130 when a user initiates a purchase of one or more products via the client device 110. The API calls comprise instructions, that when executed by the client device 110, obtain information describing the purchase from the client device 110. For example, one or more API calls extract information identifying products purchased from the merchant system 130, a total purchase amount of the purchase, a date and a time of the purchase, a device identifier, an application identifier, an identifier of the user to the merchant system 130, or any other suitable information. Executing the API calls included in the checkout page allows the client device 110 to transmit information identifying the purchase to the online system 140 (or to the third-party merchant system 130, which transmits the information to the online system 140), which the online system 140 compares to the one or more conditions to determine whether to generate a virtual credit card based on the purchase, as further described below in conjunction with FIG. 3. Alternatively, the online system 140 hosts the checkout page, and the merchant system 130 redirects a client device 110 from which a user is purchasing one or more products to the online system 140 for retrieving the checkout page. In the preceding example, the online system 140 obtains information identifying the purchase from the information the user enters into the checkout page hosted by the online system 140.

Additionally, in some embodiments, the online system 140 receives payment information for a purchase by a user via the merchant system 130 and processes the user's payment for the purchase from the payment information. For example, the online system 140 exchanges information with a financial institution corresponding to the payment information to determine whether an account maintained by the financial institution corresponding to the payment information has an amount equaling or exceeding a total purchase amount in the information identifying the transaction. This allows the online system 140 to determine whether a purchase via the merchant system 140 is authorized or is not authorized.

Figure 2:
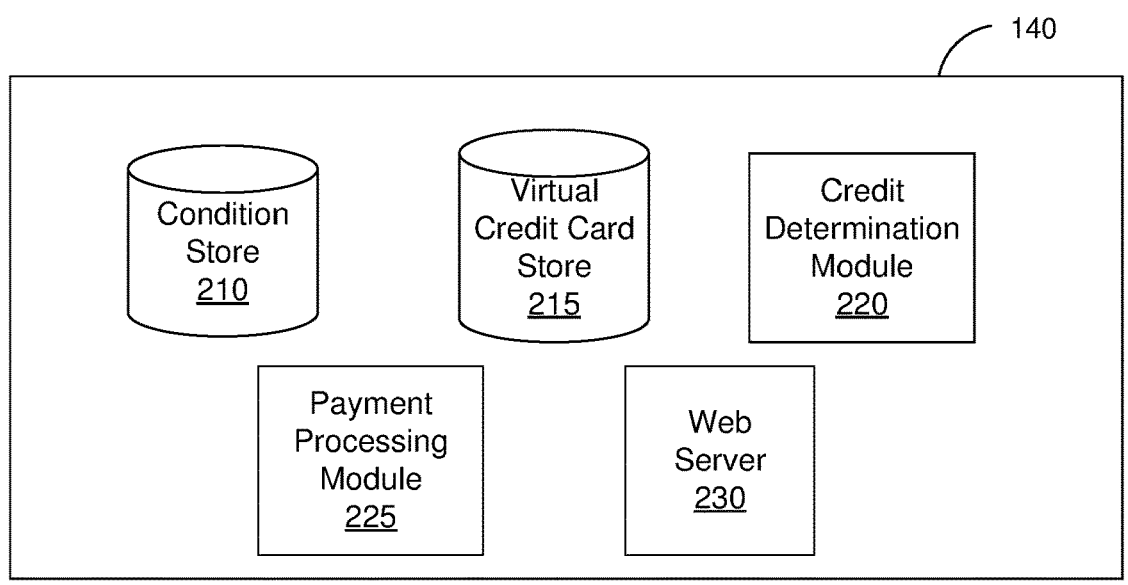
FIG. 2 is a block diagram of an online system, in accordance with an embodiment.

FIG. 2 is a block diagram of an architecture of the online system 140. The online system 140 shown in FIG. 2 includes a condition store 210, a virtual credit card store 215, a credit determination module 220, a payment processing module 225, and a web server 230. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

The online system 140 receives conditions from one or more merchant systems 130 for issuing a virtual credit card to users. Conditions received from a merchant system 130 are stored in the condition store 210 in association with an identifier from which the conditions were received. In various embodiments, the condition store 210 comprises a database that includes a description of a condition in association with an identifier of a merchant system 130 from which the condition was received. Additionally, the online system 140 stores a specified amount in association with a condition and with the identifier of the merchant system 130 from which the condition was received. In various embodiments, different conditions specify different amounts.

The virtual credit card store 215 includes funds received from a merchant system 130 for issuing virtual credit cards to users of the merchant system 130. In various embodiments, the virtual credit card store 215 includes an identifier of an account maintained by a financial institution that includes a monetary amount allocated by the merchant system 130 for issuing virtual credit cards. This allows a merchant system 130 to provide funding used by the online system 140 to issue virtual credit cards.

Additionally, the virtual credit card store 215 includes information identifying virtual credit cards issued by the online system 140 for users of one or more merchant systems 130. A virtual credit card corresponds to an account maintained by the online system 140 for the merchant system 130 from the funds received from the merchant system 130 and identified in the condition store 210. The virtual credit card includes a unique code or other identifying information that uniquely identifies the virtual credit card. The virtual credit card store 215 stores an association between the account maintained by the online system 140 for the merchant 130, the specified amount corresponding to a condition in the condition store 210 that is satisfied by information describing a purchase by a user, an identifier of the merchant system 130, and the information identifying the virtual credit card. In some embodiments, the virtual credit card store 215 also associates the information identifying the virtual credit card in association with a user of the merchant system 130 for which the virtual credit card was issued.

The credit determination module 220 receives information identifying a purchase by a user via a merchant system 130 and compares the information identifying the purchase to one or more conditions from the condition store 210 associated with the merchant system 130. Additionally, as further described below in conjunction with FIG. 3, the credit determination module 220 maintains one or more artificial intelligence machine learned models that are applied to characteristics of a user obtained from a merchant system 130, to characteristics of a current purchase by a user via the merchant system 130, and to characteristics of prior purchases by the user via the merchant system 130 to select an amount of a virtual credit card issued by the online system 140 to result in an increased likelihood that the user completes the current purchase via the merchant system 130 or to result in a specific likelihood that the user completes the current purchase via the merchant system 130. In response to determining that the information identifying the purchase satisfies a condition from the condition store 210 associated with the merchant system 130, the credit determination module 220 debits an account associated with the merchant system 130 and generates a virtual credit card for the user in an amount specified by the satisfied condition, as further described below in conjunction with FIG. 3. For example, if a condition specifies a total purchase amount and information identifying a purchase by a user via the merchant system 130 includes a total purchase amount equaling or exceeding the total purchase amount in the condition, the credit determination module 220 issues a virtual credit card to the user in an amount specified by the satisfied condition using the account associated with the merchant system 130 by the online system 140 and stores information identifying the virtual credit card in the virtual credit card store 215. If information identifying a purchase by a user via the merchant system does not satisfy at least one condition associated with the merchant system 130 in the condition store 210, the credit determination module 220 does not issue a virtual credit card to the user. Further, if the virtual credit card store 215 includes a virtual credit card associated with the user and with the merchant system 130, the credit determination module 220 increments an amount allocated to the virtual credit card by an amount specified by a condition satisfied by the information identifying a purchase by the user via the merchant system 130.

The payment processing module 225 receives payment information for a purchase by a user via the merchant system 130 and processes the user's payment for the purchase from the payment information. For example, the payment processing module 225 requests confirmation from a financial institution corresponding to the received payment information whether an account corresponding to the payment information has an amount equaling or exceeding a total purchase amount of the purchase via the merchant system 130. In response to receiving a confirmation from the financial institution, the payment processing module 225 communicates an authorization for the purchase to the merchant system 130 via the web server 230. In response to receiving an indication from the financial institution that the account corresponding to the payment information has an amount less than the total purchase amount, the payment processing module 225 transmits a denial of the purchase to the merchant system 130.

The web server 230 links the pricing server 140 via the network 120 to the one or more client devices 110, as well as to the merchant system 130. The web server 230 serves web pages, as well as other content, such as JAVA®, FLASH®, XML and so forth. The web server 230 may receive and route messages between the pricing server 140 and the merchant system 130, for example, instant messages, queued messages (e.g., email), text messages, short message service (SMS) messages, or messages sent using any other suitable messaging technique. The web server 230 receives information describing purchases by users of a merchant system 130 via a client device 110 via the merchant system 130 or via the client device 110 that the credit determination module 215 compares to one or more conditions in the condition store 210 associated with the merchant system 130. Additionally, the web server 230 may provide application programming interface (API) functionality to send data directly to native client device operating systems, such as IOS®, ANDROID™, or BlackberryOS.

Figure 3:
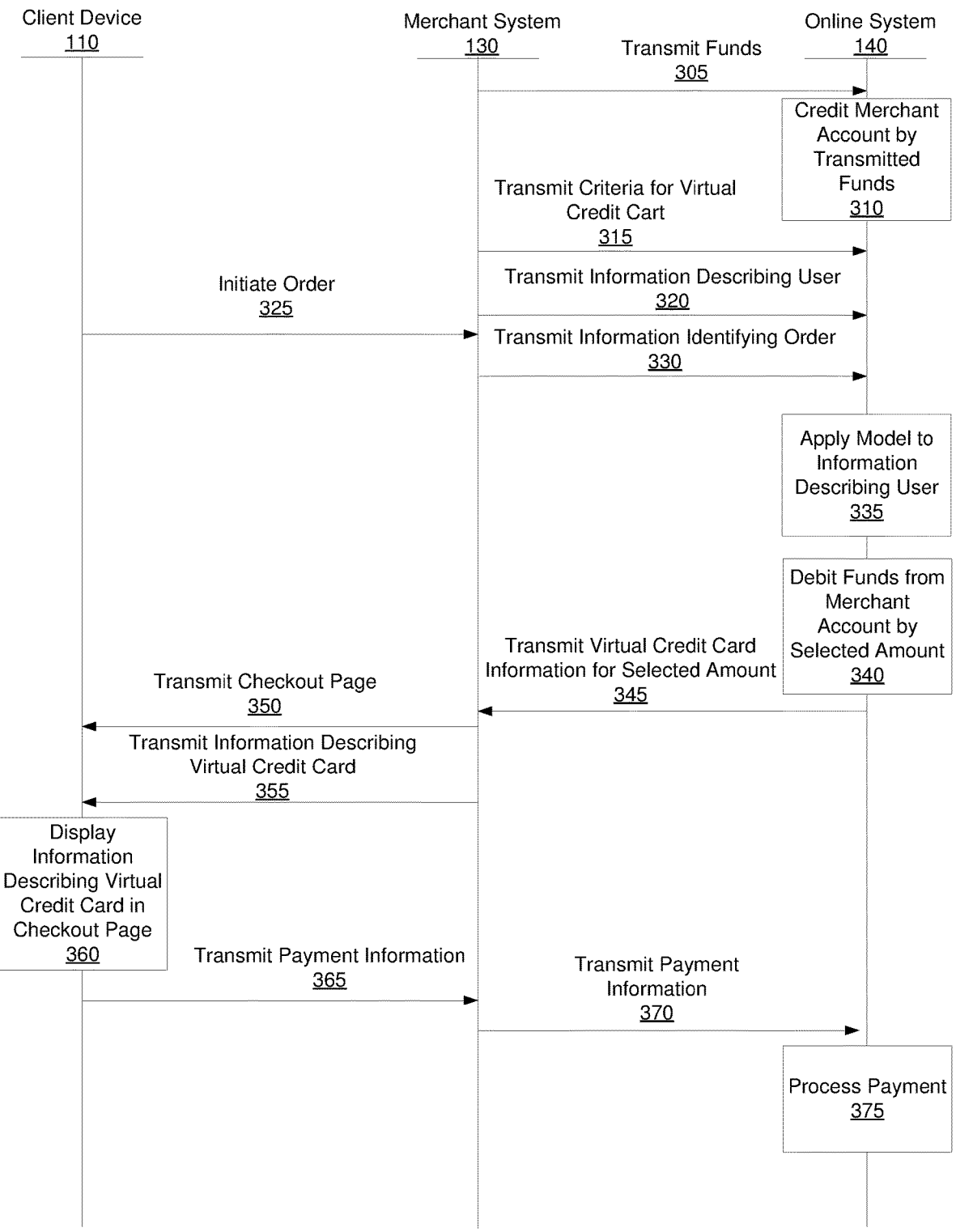
FIG. 3 is an interaction diagram of a method for an online system providing a virtual credit card to a user while the user is purchasing a product, in accordance with an embodiment.

Providing a Virtual Credit Card to a User in a Product Purchase Flow of a User Interface FIG. 3 is an interaction diagram of one embodiment of a method for an online system 140 providing a virtual credit card to a user while the user is purchasing a product via a merchant system 130. The method may include different or additional steps than those described in conjunction with FIG. 3 in various embodiments. Further, the steps of the method may be performed in different orders than the order described in conjunction with FIG. 3 in various embodiments.

The merchant system 130 transmits 305 funds to an online system 140 that are used by the online system 140 to subsequently issue virtual credit cards for specific amounts to users purchasing one or more products via the merchant system 130. In various embodiments, the merchant system 130 identifies a particular funding amount and an account of a financial institution from which the online system 140 obtains the particular funding amount. Alternatively, the merchant system 130 provides instructions a financial institution that transfers the particular amount from an account corresponding to the merchant system to a different account corresponding to the online system 140. Hence, the online system 140 establishes an account for the merchant system 130, also referred to as a "merchant account," and credits 310 the merchant account by an amount of the funds transmitted 305 to the online system 140 from the merchant system 130.

Additionally, the merchant system 130 transmits 315 one or more criteria for issuing a virtual credit card to a user of the merchant system 130. Example criteria include an order including one or more specific product identifiers, an order occurring during a specific time interval, an order having a threshold amount of revenue to the merchant system 130, an order including a threshold number of products, purchasing products within a specified time interval, a user leaving the merchant system 130 with one or more products included in an online shopping cart, a user accessing a specific product via the merchant system 130 at least a threshold number of times, and the user adding and removing one or more products from an online shopping cart via the merchant system 130. In various embodiments, the online system 140 receives different amounts for a virtual credit card from the merchant system 130. The criteria may associate different amounts for the virtual credit card (e.g., different specific monetary amounts, different percentages of an amount of revenue for an order). Additionally, different virtual credit card amounts may be associated with different order amounts. In some embodiments, the merchant system 130 specifies different amounts for the virtual credit card when different conditions are satisfied. For example, a virtual credit card is issued for a first amount when the user has a total purchase amount of a first value, while a virtual credit card is issued for a different second amount when the user has a total purchase amount of a different second value.

After the merchant system 130 has transmitted 305 funds, the online system 140 has credited 310 the merchant account by the amount of the funds, and transmitted 315 the conditions for issuing virtual credit cards to the online system 140, a user accesses the merchant system 130. When the user accesses the merchant system 130, the merchant system 130 transmits 320 information describing the user to the online system 140. For example, when the user logs in to the merchant system 130 to access a user account maintained by the merchant system 130, the merchant system 130 transmits 320 information describing the user to the online system 140 along with information identifying the user. As another example, the merchant system 130 receives an identifier of a client device 110 or a browser used by the user to access the merchant system 130 along with information previously received by the merchant system 130 from the identifier of the client device 110 or the browser. The information describing the user includes characteristics of the user and characteristics of one or more orders the merchant system 130 previously received from the user.

The online system 140 maintains a machine learned model for issuing a virtual credit card by the merchant system 130 to a user to the online system 140. In some embodiments, the online system 140 maintains different machine learned models for different merchant systems 130 and stores each model in association with an identifier of the merchant system 130. The online system 140 model trains the model to determine a probability of a user completing a purchase from the merchant system 130 when offered different amounts via a virtual credit card from the merchant system 130. The machine-learned model receives as input different characteristics of a user and prior purchases of the user via the merchant system 130 from the merchant system 130 and generates a probability of the user completing a purchase via the merchant system 130 for different amounts of a virtual credit card offered by the merchant system 130 to the user. Example characteristics of a user received as input by the model include: an amount of revenue the merchant system 130 received form the user during a specific time interval (e.g., a month), a frequency with which the user visits the merchant system 130, products offered by the merchant system 130 that the user has previously purchased, amounts of various orders that the user has previously purchased from the merchant system 130, amounts of orders that the user has previously specified by not purchased from the merchant system 130, or any other suitable information. Additionally, the machine learned model accounts for characteristics of products the user has currently selected for purchase from the merchant system 130. Example characteristics of products currently selected for purchase from the merchant system 130 include: a number of times the user has accessed information about a product via the merchant system 130 (e.g., a number of times the user views a page describing the product), a number of times the user has previously purchased the product, a number of times the user has previously selected the product for purchase but not purchased the product, or any other suitable information. However, in other embodiments, the trained machine-learning model may use any suitable characteristics or combination of characteristics of a user from the merchant system 130 and characteristics of orders by the user from the merchant system 130 as inputs. From the characteristics of one or more orders via the merchant system 130, characteristics of the user received from the merchant system 130, and one or more amounts for a virtual credit card issued by the merchant system 130, the trained machine-learning model outputs a probability of the user completing an order from the merchant system 130 when issued a virtual credit card for different amounts. In various embodiments, the online system 140 trains the trained machine-learning model based on information describing prior completion of orders by different users from the merchant system 130 when users receive virtual credit cards having different amounts from the merchant system 130. For example, the online system 130 applies a label indicating whether a user completed a purchase via the merchant system 130 when offered a virtual credit card for a specific amount from the merchant system 130 to characteristics of the order and characteristics of the user who placed the order. From the labeled characteristics of the orders and corresponding characteristics of the users, the online system 130 trains the trained artificial intelligence machine learning model using any suitable training method or combination of training methods. After training, the online system 130 applies the trained machine-learned model to characteristics of an order received from the merchant system 130 and to characteristics of the user received form the merchant system 130, and different amounts of a virtual credit card issued by the merchant system 130, and the trained machine-learned model output probabilities of the user completing the order when offered a virtual credit card having different amounts. Hence, application of the trained machine learned model determines probabilities of the user completing a purchase when offered different amounts of a virtual credit card by the merchant system 130.

When the user initiates 325 an order from the merchant system 130 via a client device 110, the merchant system 130 transmits 330 information identifying the order to the online system 140. For example, the user accesses a website or an application associated with the merchant system 130 via the client device 110, selects one or more products from the merchant system 130 via the client device 110, and transmits a request to purchase the selected one or more products including identifiers of the one or more products to the merchant system 130 to initiate 315 an order. The online system 140 applies 335 the model received from the merchant system 130 to the characteristics of the user, to characteristics of the identified order, and to characteristics of orders previously received by the merchant system 130 from the user. The online system 140 includes the information identifying the order in the characteristics of orders and characteristics of the user to which the online system 140 applies 335 the trained machine learned model. This allows the online system 140 to determine likelihoods of the user completing the initiated order if the merchant system 130 issues virtual credit cards in different amounts to the user, allowing the online system 140 to select an amount for a virtual credit card to offer the user that maximizes a likelihood of the user completing the initiated order.

In some embodiments, the online system 140 transmits a message to the merchant system 130 for display to the user that identifies the amount of the virtual credit card selected by the online system 140. The merchant system 140 transmits the message to the client device 110 along with content describing one or more products. In some embodiments, the message identifies one or more criteria for the user's order to satisfy for the merchant system 130 to issue a virtual credit card for the selected amount to the user. For example, the message identifies an amount for the order to reach for the merchant system 130 to issue a virtual credit card for the selected amount to the user. In some embodiments, the message includes one or more instructions specifying when the message is displayed. For example, one or more instructions included in the message cause the message to be displayed when the merchant system 130 adds an additional product to a current order or when the merchant system 130 displays an online shopping basket or other information describing a current order.

The online system 140 applies one or more conditions received from the merchant system 130 to the information identifying the order. Hence, the online system 140 determines whether information identifying the purchase satisfies a threshold amount of the one or more conditions from the merchant system 130. For example, the online system 140 applies a condition specifying a total purchase amount by comparing the total purchase amount in the condition to the total purchase amount in the information identifying the purchase; the online system 140 determines the condition is satisfied if the total purchase amount included in the information identifying the purchase equals or exceeds the total purchase amount in the condition. Similarly, the online system 140 may compare product identifiers included in the information identifying the purchase to product identifiers included in one or more conditions or compare a date and a time included in the information identifying the purchase to a specific time interval included in a condition to determine whether the purchase satisfies one or more conditions. In response to determining the order information satisfies the threshold amount of the conditions, the online system 140 determines the user is eligible to receive a virtual credit card issued by the merchant system 130 for the amount selected by application 325 of the trained machine learned model to characteristics of the user and to characteristics of the order.

In the example of FIG. 3, execution of one or more API calls in the checkout page by the client device 110 retrieves information identifying the order by the user from the checkout page. For example, information identifying the order specifies a total purchase amount, specifies product identifiers of products being purchased by the user, and a date and a time when the user initiated 330 the order. Additionally, the information identifying the order includes an order identifier to uniquely identify the order, and may include a device identifier of the client device 110, an application identifier of an application executing on the client device 110 from which the purchase was initiated 325, or information identifying the user from the merchant system 130. The information identifying the order is transmitted from the client device 110 to the merchant system 130, which transmits 330 the information identifying the order to the online system 140. However, in other embodiments, the client device 110 transmits the information identifying the purchase to the online system 140.

In response to the information identifying the purchase satisfying one or more of the conditions, the online system 140 generates a virtual credit card for the user by debiting 340 the funds received from the merchant system 130 by the amount selected by application 325 of the trained machine learned model if the information identifying the order satisfies a threshold amount of conditions. The virtual credit card corresponds to an account maintained by the online system 140 for the merchant system 130 from the funds received from the merchant system 130. The virtual credit card includes a unique code or other identifying information that uniquely identifies the virtual credit card. The online system 140 stores an association between the account maintained by the online system 140 for the merchant system 130 (i.e., the "merchant account"), the selected amount from application 335 of the trained machine learned model, the merchant system 130, and the information identifying the virtual credit card. After generating the virtual credit card, the online system 140 transmits 345 information identifying the virtual credit card, such as the unique code corresponding to the virtual credit card and the specified amount of the virtual credit card, to the merchant system 140, which transmits 355 information describing the virtual credit card to the client device 110. In other embodiments, the online system 140 transmits the information describing the virtual credit card to the client device 110.

The merchant system 130 transmits 350 a checkout page to the client device 110, which displays the checkout page, in response to receiving a request from the client device 110 for the user to check out, or otherwise complete, the order. In various embodiments, the checkout page includes one or more application programming interface (API) calls comprising instructions, that when executed by the client device 110, obtain information and transmit the obtained information to the merchant system 130 or to the online system 140. While FIG. 3 shows an example where the merchant system 130 transmits the checkout page including API calls to the client device 110, in other embodiments, the checkout page is maintained by the online system 140, so the merchant system 130 transmits information describing purchase initiation to the online system 140, which transmits 340 the checkout page to the client device 110 for presentation.

The client device 110 displays 365 the information describing the virtual credit card to the user via the checkout page. In various embodiments, the client device 110 displays 365 the code or other information identifying the virtual credit card and the specified amount of the virtual credit card via the checkout page. However, the client device 110 may display 365 any suitable information describing the virtual credit card to the user via the checkout page in various embodiments.

In some embodiments, the client device 110 displays 360 the information describing the virtual credit card via an order confirmation page displayed to the user after the client device 110 transmits 365 payment information for the purchase to the merchant system 130 or to the online system 140. The order confirmation page is displayed by the client device 110 before the online system 140 processes the payment information for the purchase received via a checkout page and displays 360 the information describing the virtual credit card via the order confirmation page. Through the order confirmation page, the user may select the virtual credit card to apply the specified amount of the virtual credit card to the purchase, reducing the total purchase amount by the specified amount. This allows the merchant system 130 to reduce an amount spent by the user when purchasing products without discounting products, which may impair the user's perception of the merchant system 130. Further, allowing the user to apply the specified amount of the virtual credit card to the purchase may encourage the user to subsequently make additional purchases of products via the merchant system 130, increasing purchases from the merchant system 130 over time.

In various embodiments, the merchant system 130 receives the virtual credit card information from the online system 140 before the user completes a purchase via the merchant system 130. Virtual credit card information received from the online system 140 includes the selected amount of the virtual credit card, a number of times the virtual credit card may be used, an activation date of the virtual credit card, a termination date after which the virtual credit card may not be used, as well one or more codes identifying the virtual credit card. For example, after receiving payment information from the user (via the client device 110 or via the merchant system 130), the online system 140 displays 360 information identifying the virtual credit card to the user via an order confirmation web page. This allows the user to use the virtual credit card to pay for a portion of the user's purchase. Hence, the virtual credit card allows the merchant system 130 to discount the user's purchase price without offering a discount to the user, which may reduce the user's perception of the merchant system 130. Additionally, providing the user with information about the virtual credit card while the user is purchasing products from the merchant system 130 may entice the user to purchase additional products from the merchant system 130 or to more frequently purchase products from the merchant system 130. In various embodiments, the merchant system 130 specifies an activation date and a termination date for the virtual credit card that are both later than a date of the purchase, allowing the user to use the virtual credit card for one or more subsequent purchases from the merchant system 130 made after the current purchase and before the termination date of the virtual credit card; this may entice the user to make additional purchases via the merchant system 130. In embodiments where the information describing the virtual credit card is displayed 360 via a confirmation page displayed after the client device 110 transmits 365 payment information to the merchant system 120, the online system 130 may condition transmission of the information describing the virtual credit cart to the client device 110 on receiving an authorization of the purchase from a financial institution maintaining an account corresponding to the payment information that indicates the account corresponding to the payment information has the sufficient amount of funding for the total purchase amount.

Additionally, the online system 140 may store the virtual credit card in association with information identifying the user (e.g., a device identifier of the client device 110, an application identifier of an application executing on the client device from which the purchase was initiated 315, or information identifying the user from the merchant system 130) and information identifying the merchant system 130. Subsequently, if the user initiates additional purchases via the merchant system 130 that satisfy one or more of the conditions, the online system 140 adds additional specified amounts corresponding to the satisfied one or more conditions to the virtual credit card, allowing the user to accrue additional amounts on the virtual credit card that can subsequently be redeemed when purchasing products via the merchant system 130.

In some embodiments, the user also transmits 365 payment information from the client device 110 to the merchant system 130, which transmits 370 the payment information to the online system 140. For example, the user enters credit card information or other information identifying a financial account into one or more forms included in the checkout page via the client device 110 as payment information for products selected by the user. Alternatively, the client device 110 transmits the payment information to the online system 140 via one or more API calls included in the checkout page. From the received payment information, the online system 140 processes 375 payment for the purchase. For example, the online system 140 identifies the total purchase amount and the merchant system 130 to a financial institution corresponding to the payment information, which determines whether an account corresponding to the payment information has a sufficient amount of funding for the total purchase amount. The online system 140 receives an authorization of the purchase if the account corresponding to the payment information has the sufficient amount of funding for the total purchase amount or receives a denial of the purchase if the account corresponding to the payment information does not have the sufficient amount of funding for the total purchase amount.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for expanding functionalities of hypertext markup language (HTML) pages of a plurality of different third-party systems to include machine-learned capabilities, the computer-implemented method comprising:

providing, to the plurality of third-party systems by an online system, an application programming interface (API), wherein each third-party system is associated with a third-party system identifier;

receiving a plurality of prior orders placed by different users from the plurality of different third-party systems;

generating a set of training samples using the plurality of prior orders, each training sample corresponding to a prior order of the plurality of prior orders, each training sample including a value that was offered to one of the different users and a label of whether the corresponding prior order was completed;

including, in each training sample of the set of training samples, labeled characteristics of the corresponding prior order and corresponding characteristics of the one of the different users;

receiving, at the online system, information from a first third-party system, the information describing users of the first third-party system, the information including characteristics of the users of the first third-party system and characteristics of one or more prior browsing sessions associated with the users of the first third-party system;

training a plurality of machine-learned models, wherein each of the plurality of machine-learned models is trained for one of the third-party systems and is associated with the third-party system identifier corresponding to the one of the third-party systems, wherein training the plurality of machine-learned models comprises training a first machine-learned model for the first third-party system, wherein training the first machine-learned model for the first third-party system comprises:
inputting the information from the first third-party system to the first machine-learned model, the information including the characteristics of the users of the first third-party system and the characteristics of the one or more prior browsing sessions associated with the users of the first third-party system,
inputting the set of training samples to the first machine-learned model, and
adjusting the first machine-learned model to predict values that were offered to the users of the first third-party system;
providing, to the first third-party system, executable code for executing an API call that is configured to call the online system that hosts the first trained machine-learned model, wherein incorporating the executable code of the API call into a checkout HTML page of the first third-party system expands the functionalities of the checkout HTML page by causing the API call to be executed, wherein the executable code of the API call to be incorporated into the checkout HTML page comprises instructions for (1) extracting information describing a collection of items fixed at the checkout HTML page and (2) transmitting the information describing the collection of items to the online system that hosts the first trained machine-learned model;
receiving, in real-time during a web browsing session between a particular user and the first third-party system, the API call from a user device, the API call being part of the executable code incorporated in the checkout HTML page maintained by the first third-party system for a current transaction, wherein the checkout HTML page is transmitted by the first third-party system to the user device as part of the web browsing session in response to the user selecting a collection of items that are specific to the particular user and specific to the web browsing session, wherein the API call comprises instructions, when executed by the user device, causes the user device to:
(1) extract the information describing the collection of the items that are fixed at the checkout HTML page, specific to the particular user and specific to the web browsing session, and
(2) transmit the information describing the collection of the items to the online system that hosts the first trained machine-learned model;
applying, in real-time during the web browsing session between the particular user and the first third-party system, the first trained machine-learned model to characteristics of the particular user, characteristics of one or more prior browsing sessions associated with the particular user and the information describing the collection of the items extracted by the instructions associated with the API call, wherein applying the first trained machine-learned model comprises determining probabilities of a plurality of candidate session-specific values that cause the particular user to complete the current transaction, the plurality of candidate session-specific values being specific to the collection of the items of the web browsing session fixed at the checkout HTML page;
applying, in real-time during the web browsing session between the particular user and the first third-party system, the first trained machine-learned model to select a session-specific value from the candidate session-specific values, a selected session-specific value having a maximum probability of the particular user completing the current transaction;
causing, as a response of the API call and during the web browsing session between the particular user and the first third-party system, a transmission of the selected session-specific value, the selected session-specific value being part of the response in the current web browsing session, wherein the selected session-specific value is displayed on the checkout HTML page as part of content of the checkout HTML page;
receiving, at the online system, an indication from the first third-party system that the current transaction is completed; and
creating a data entry associating the selected session-specific value with the first third-party system.

2. The method of claim 1, further comprising:
transmitting a message from the online system to the first third-party system, the message including the selected session-specific value.

3. The method of claim 2, wherein the message further includes information describing at least one criteria for determining the session-specific value.

4. The method of claim 2, wherein the message includes instructions specifying when the session-specific value is transmitted from the first third-party system to the user device for display to the particular user.

5. The method of claim 4, wherein the instructions specify when the message is displayed.

6. The method of claim 4, wherein the instructions specify that the message is displayed when the first third-party system displays an online shopping basket to the particular user.

7. The method of claim 1, wherein the characteristics of the particular user are selected from a group consisting of: an amount of revenue the first third-party system received from the particular user during a specific time interval, a frequency with which the particular user visits the first third-party system, products offered by the first third-party system that the particular user has previously purchased, amounts of various orders that the particular user has previously purchased from the first third-party system, amounts of orders that the particular user has previously specified but not purchased from the first third-party system, and any combination thereof.

8. The method of claim 1, wherein the characteristics of one or more prior browsing sessions associated with the particular user are selected from a group consisting of: a number of times the particular user has accessed information about a product via the first third-party system, a number of times the particular user has previously purchased the product, a number of times the particular user has previously selected the product for purchase but not purchased the product, and any combination thereof.

9. The method of claim 1 wherein one or more criteria for determining the session-specific value are selected from a group consisting of: a threshold number of items in the collection, the particular user leaving the first third-party system with one or more products included in an online shopping cart, the particular user accessing a specific product via the first third-party system at least a threshold number of times, the particular user adding and removing one or more products from the online shopping cart via the first third-party system and any combination thereof.

10. The method of claim 1, further comprising training a second machine-learned model for a second third-party system to expand the functionalities of the HTML page of the second third-party system.

11. A computer program product comprising a non-transitory computer readable storage medium having instructions for expanding functionalities of HTML pages of a plurality of different third-party systems to include machine-learned capabilities that allow the HTML pages to determine, in real-time within a duration of a web browsing session, user-and-session specific information, wherein the instructions, when executed by a processor, cause the processor to:
provide, to the plurality of third-party systems by an online system, an application programming interface (API), wherein each third-party system is associated with a third-party system identifier;
receive a plurality of prior orders by different users from the plurality of different third-party systems;
generate a set of training samples using the plurality of prior orders, each training sample corresponding to a prior order, each training sample including a value that was offered to one of the different users and a label of whether the corresponding prior order was completed;
include, in each training sample, labeled characteristics of the prior order and corresponding characteristics of the one of the different users;
receive, at the online system, information from a first third-party system, the information describing users of the first third-party system, the information including characteristics of the users and characteristics of one or more prior browsing sessions associated with the users;
train a plurality of machine-learned models, wherein each of the plurality of machine-learned models is trained for one of the third-party systems and is associated with the third-party system identifier corresponding to the one of the third-party systems, wherein training the plurality of machine-learned models comprises training a first machine-learned model for the first third-party system, wherein training the first machine-learned model for the first third-party system comprises:
inputting the information from the first third-party system to the first machine-learned model, the information including characteristics of the users of the first third-party system and characteristics of the one or more prior browsing sessions associated with the users of the first third-party system,
inputting the set of training samples to the first machine-learned model, and
adjusting the first machine-learned model to predict values that were offered to the users of the first third-party system;
provide, to the first third-party system, executable code for executing an API call that is configured to call the online system that hosts the first trained machine-learned model, wherein incorporating the executable code of the API call into a checkout HTML of the first third-party system expands the functionalities of the checkout HTML page by causing the API call to be executed, wherein the executable code of the API call to be incorporated into the checkout HTML page comprises instructions for (1) extracting information describing a collection of items fixed at the checkout HTML page and (2) transmitting the information describing the collection of items to the online system that hosts the first trained machine-learned model;
receive, in real-time during a web browsing session between a particular user and the first third-party system, the API call from a user device, the API call being part of the executable code incorporated in the checkout HTML page maintained by the first third-party system for a current transaction, wherein the checkout HTML page is transmitted by the first third-party system to the user device as part of the web browsing session in response to the user selecting a collection of items that are specific to the particular user and specific to the web browsing session, wherein the API call comprises instructions, when executed by the user device, causes the user device to:
(1) extract the information describing the collection of the items that are fixed at the checkout HTML page that are specific to the particular user and specific to the web browsing session, and
(2) transmit the information describing the collection of the items to the online system that hosts the first trained machine-learned model;
apply, in real-time during the web browsing session between the particular user and the first third-party system, the first trained machine-learned model to the characteristics of the particular user, the characteristics of one or more prior browsing sessions associated with the particular user and the characteristics of the items in the collection extracted by the instructions associated with the API call, wherein applying the first trained machine-learned model comprises determining probabilities of a plurality of candidate session-specific values that cause the particular user to complete the current transaction, the plurality of candidate session-specific values being specific to the collection of items of the web browsing session fixed at the checkout HTML page;
apply, in real-time during the web browsing session between the particular user and the first third-party system, the first trained machine-learned model to select a session-specific value from the candidate session-specific values, a selected session-specific value having a maximum probability of the particular user completing the current transaction;
cause, as a response of the API call and during the web browsing session between the particular user and the first third-party system, a transmission of the selected session-specific value, the selected session-specific value being part of the response in the current web browsing session, wherein the selected session-specific value is displayed on the checkout HTML page as part of content of the checkout HTML page;
receive, at the online system, an indication from the first third-party system that the current transaction is completed; and
create a data entry associating the selected session-specific value with the first third-party system.

12. The computer program product of claim 11, wherein the instructions, when executed, further cause the processor to:
transmit a message from the online system to the first third-party system, the message including the selected session-specific value.

13. The computer program product of claim 12, wherein the message further includes information describing at least one criteria for determining the session-specific value.

14. The computer program product of claim 13, wherein the message includes instructions specifying when the session-specific value is transmitted from the first third-party system to the user device for display to the particular user.

15. The computer program product of claim 14, wherein the instructions specify when the message is displayed.

16. The computer program product of claim 14, wherein the instructions specify that the message is displayed when the first third-party system displays an online shopping basket to the particular user.

17. The computer program product of claim 11, wherein the characteristics of the particular user are selected from a group consisting of: an amount of revenue the first third-party system received from the particular user during a specific time interval, a frequency with which the particular user visits the first third-party system, products offered by the first third-party system that the particular user has previously purchased, amounts of various orders that the particular user has previously purchased from the first third-party system, amounts of orders that the particular user has previously specified but not purchased from the first third-party system, and any combination thereof.

18. The computer program product of claim 11, wherein the characteristics of one or more prior browsing sessions associated with the particular user are selected from a group consisting of: a number of times the particular user has accessed information about a product via the first third-party system, a number of times the particular user has previously purchased the product, a number of times the particular user has previously selected the product for purchase but not purchased the product, and any combination thereof.

19. The computer program product of claim 11, wherein one or more criteria for determining the session-specific value are selected from a group consisting of: a threshold number of items in the collection, the particular user leaving the first third-party system with one or more products included in an online shopping cart, the particular user accessing a specific product via the first third-party system at least a threshold number of times, the particular user adding and removing one or more products from the online shopping cart via the first third-party system and any combination thereof.

20. The computer program product of claim 11, wherein the instructions, when executed, further cause the processor to train a second machine-learned model for a second third-party system to expand the functionalities of the HTML page of the second third-party system.

* * * * *